US006643755B2

United States Patent
Goodhue et al.

(10) Patent No.: US 6,643,755 B2
(45) Date of Patent: Nov. 4, 2003

(54) CYCLICALLY SEQUENTIAL MEMORY PREFETCH

(75) Inventors: Gregory K. Goodhue, San Jose, CA (US); Ata R. Khan, Saratoga, CA (US); John H. Wharton, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

(21) Appl. No.: 09/788,692

(22) Filed: Feb. 20, 2001

(65) Prior Publication Data

US 2002/0116579 A1 Aug. 22, 2002

(51) Int. Cl.[7] ............................................. G06F 12/00
(52) U.S. Cl. ................... 711/173; 365/189.05; 710/52; 711/119; 711/154; 711/173; 711/153; 712/205
(58) Field of Search ................. 365/189.05; 710/52, 710/56, 310; 711/113, 119, 120, 123, 129, 133, 153, 154, 170, 171, 172, 173, 213, 217; 712/205, 206, 207

(56) References Cited

U.S. PATENT DOCUMENTS

| | | | | |
|---|---|---|---|---|
| 4,755,933 A | * | 7/1988 | Teshima et al. | 711/157 |
| 5,537,578 A | * | 7/1996 | Day et al. | 711/165 |
| 5,619,663 A | * | 4/1997 | Mizrahi-Shalom et al. | 712/207 |
| 5,692,182 A | * | 11/1997 | Desai et al. | 707/10 |
| 5,721,858 A | * | 2/1998 | White et al. | 711/203 |
| 5,835,967 A | * | 11/1998 | McMahan | 711/213 |
| 5,978,866 A | * | 11/1999 | Nain | 710/22 |
| 6,079,006 A | * | 6/2000 | Pickett | 711/213 |
| 6,239,633 B1 | * | 5/2001 | Miyano | 327/158 |
| 2002/0143988 A1 | * | 10/2002 | Jensen | 709/240 |

FOREIGN PATENT DOCUMENTS

| | | |
|---|---|---|
| EP | 0199946 | 11/1986 |
| EP | 0180237 | 5/1996 |
| EP | 0921464 | 6/1999 |

OTHER PUBLICATIONS

Palacharla S et al.: "Evaluating Stream Buffers as a Secondary Cache Replacement", Proceeding ONF the Annual International Symposium on Computer Architecture. Chicago, Apr. 18–21, 1994, Los Alamitos, IEEE Comp. Soc. Press, US, pp. 24–33. vol. Symp. 21.
U.S. patent application Ser. No. 09/780,158, "Memory Accelerator for ARM Processors," Goodhie et al.

* cited by examiner

*Primary Examiner*—Donald Sparks
*Assistant Examiner*—Christian P. Chace
(74) *Attorney, Agent, or Firm*—Michael Schmitt

(57) ABSTRACT

A memory access architecture and technique employs multiple independent buffers that are configured to store items from memory sequentially. The memory is logically partitioned, and each independent buffer is associated with a corresponding memory partition. The partitioning is cyclically sequential, based on the total number of buffers, K, and the size of the buffers, N. The first N memory locations are allocated to the first partition; the next N memory locations to the second partition; and so on until the $K^{th}$ partition. The next N memory locations, after the $K^{th}$ partition, are allocated to the first partition; the next N locations are allocated to the second partition; and so on. When an item is accessed from memory, the buffer corresponding to the item's memory location is loaded from memory, and a prefetch of the next sequential partition commences to load the next buffer. During program execution, the 'steady state' of the buffer contents corresponds to a buffer containing the current instruction, one or more buffers containing instructions immediately following the current instruction, and one or more buffers containing instructions immediately preceding the current instruction. This steady state condition is particularly well suited for executing program loops, or a continuous sequence of program instructions, and other common program structures. The parameters K and N are selected to accommodate typically sized program loops.

14 Claims, 2 Drawing Sheets

CYCLICALLY SEQUENTIAL MEMORY PREFETCH

CROSS-REFERENCE TO RELATED APPLICATIONS

This application is related to concurrently filed U.S. patent application "MEMORY ACCELERATOR FOR ARM PROCESSORS", Ser. No. 09/780,158 (Attorney Docket US018011).

BACKGROUND OF THE INVENTION

1. Field of the Invention

This invention relates to the field of computer systems, and in particular to a system and method for minimizing memory access delays via the use of memory partitioning, sequential prefetch, and multiple independent buffers.

2. Description of Related Art

A variety of techniques are commonly available for minimizing the effects of the delay associated with retrieving program code and data from memory elements. Generally, program and data items are stored in a memory device that is external from the processor, and the time to access an item from the external memory is substantially longer than the time to access an item from memory that is collocated with the processor (internal memory). For ease of reference, the term memory is used herein to denote storage means having a relatively slow access time relative to the speed of the processor, and the term buffer is used to denote storage means having short access time relative to the speed of the processor.

A common technique is the use of a cache buffer. When an item in memory is accessed, a block of memory containing the item is read into a cache that is local to the processor. Subsequently addressed items that are also contained in the block of memory that has been read into the cache are accessed directly from cache, thereby avoiding the delay associated with an access to an item stored in memory. When a subsequently addressed item is not in cache, the appropriate block of memory is read into cache, incurring the memory access delay. The larger the size of the cache, the more likely it will be that an addressed item will be within the cache. Other parameters may also affect the likelihood of an item being within the cache. For example, one routine may repeatedly call another routine. If the two routines are in proximity with each other, they may both lie within the cache, and no memory access delays will be incurred; otherwise, a memory access will be required with each call and return between the routines. Commonly, multiple independent caches are used, so that different blocks of memory, from potentially distant parts of memory, can be stored. In the example of one routine repeatedly calling another, one cache may contain the first routine, and another cache may contain the second routine, and an access to either routine, via the corresponding cache, will avoid a memory access delay. A particular problem with cache buffering occurs when routines such as loops extend across the boundary between blocks. Regardless of the size of the routine, both blocks will be required to be stored, in two caches. To minimize the likelihood of routines extending across boundaries, the block/cache size is typically large, thereby reducing the number of boundaries.

To be effective, cache buffering generally requires fairly large cache buffers, typically in the order of hundreds or thousands of bytes. An alternative to conventional cache buffering is prefetch buffering, wherein subsequent instructions are read from memory into a buffer, while the processor is accessing a prior instruction from the buffer. Because the contents of the buffer are continually updated based on the address of the current instruction being executed, or based on a subsequent branch instruction, the size of the prefetch buffer can be substantially less than the size of a cache buffer and yet achieve the same effectiveness. The efficiency of a prefetch scheme can be further enhanced by applying predictive techniques to conditional branch instructions, to optimize the likelihood that the appropriate code is in the prefetch buffer when the conditional branch instruction is executed. For example, loop structures can be identified, and the prefetch algorithm can be structured to assume that the program will return to the start of the loop more often than it will exit the loop, and thereby place the instruction at the start of the loop immediately after the conditional branch instruction that controls whether the loop is re-executed or exited. Only when the conditional branch instruction results in an exit will the processor be delayed, while the instructions after the loop are loaded into the buffer from memory.

In both the cache and prefetch buffering approaches, the time required to execute a program is substantially indeterminate, because the likelihood of a required item being in the local buffer is indeterminate, and therefore the number of times a memory access will be required is indeterminate.

BRIEF SUMMARY OF THE INVENTION

It is an object of this invention to provide a memory access technique that is substantially deterministic. It is a further object of this invention to provide a memory access technique that is efficient with regard to the size of the internal buffer. It is a further object of this invention to provide a memory access technique that is efficient with regard to overall memory access time. It is a further object of this invention to provide a memory access technique that can be combined with other memory access techniques, such as caching.

These objects and others are achieved by providing a memory access architecture and technique that employs multiple independent buffers that are configured to store items from memory sequentially. The memory is logically partitioned, and each independent buffer is associated with a corresponding memory partition. The partitioning is cyclically sequential, based on the total number of buffers K, and the size of the buffers N. The first N memory locations are allocated to the first partition; the next N memory locations to the second partition; and so on until the $K^{th}$ partition, and the allocation is repeated. The next N memory locations, after the K*N memory locations allocated to the K partitions, are allocated to the first partition; the next N locations are allocated to the second partition; and so on. When an item is accessed from memory, the buffer corresponding to the item's memory location is loaded from memory, and a prefetch of the next sequential partition commences to load the next buffer. During program execution, the 'steady state' of the buffer contents corresponds to a buffer containing the current instruction, one or more buffers containing instructions immediately following the current instruction, and one or more buffers containing instructions immediately preceding the current instruction. This steady state condition is particularly well suited for executing program loops, or a continuous sequence of program instructions, and other common program structures. The parameters K and N are selected to accommodate typically sized program loops.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
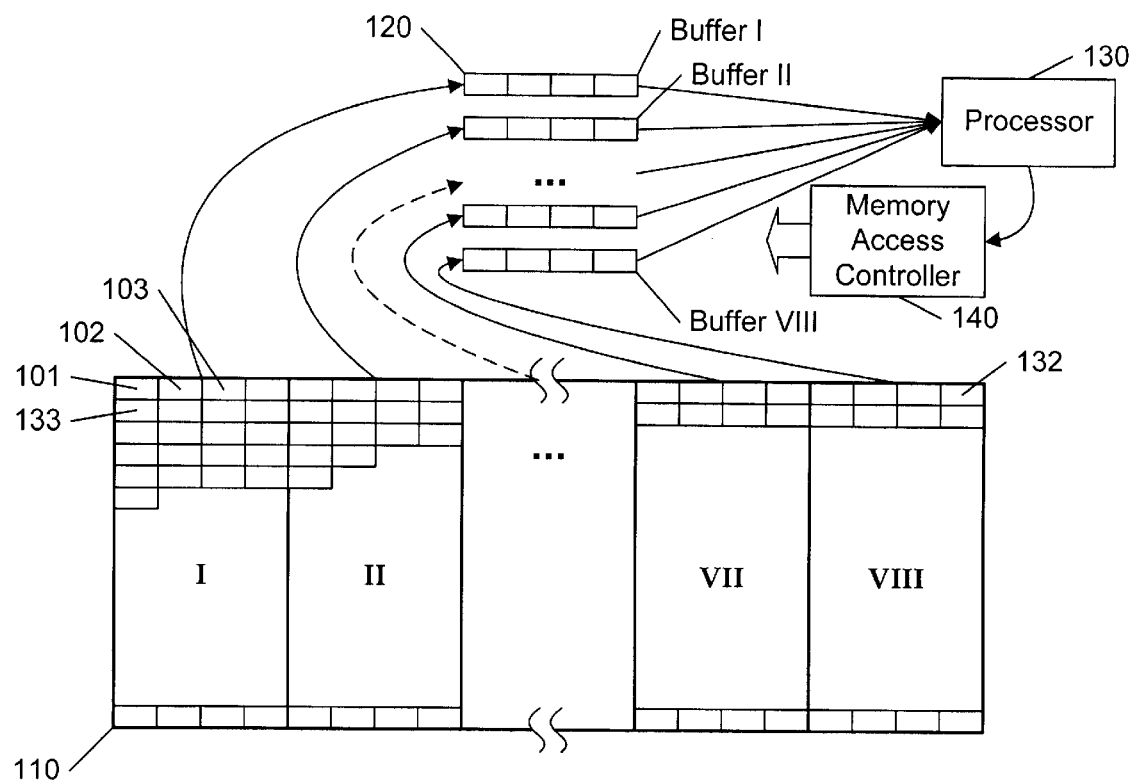
FIG. 1 illustrates an example memory access architecture in accordance with this invention.

FIG. 1 illustrates an example memory access architecture in accordance with this invention. A memory 110 is illustrated as containing sequential memory locations 101, 102, 103, etc., from left to right, and logically partitioned into memory partitions I, II, . . . VIII. As illustrated, the next sequential memory location after memory location 132 at the end of the first line of memory locations is memory location 133, on the next line below memory location 101. Memory locations 101 and 133 each correspond to a first memory location in partition I. That is, the memory locations can be viewed as forming a spiral, as the last memory location of one line circles around to the first memory location on the next line. For ease of reference, this partitioning is herein defined as a cyclically sequential partitioning, in that blocks of N memory locations are sequentially allocated to each partition, and the allocation is applied cyclically, in that the block of N memory locations following the block that is allocated to the last partition is allocated to the first partition, and this sequential and cyclic process is repeated until all of the memory locations are allocated to the partitions.

The term "segment" is used hereinafter in lieu of "line", to indicate a single set of continuous memory locations from the first memory location of the first partition to the last memory location of the last partition. If there are K partitions, and each partition is N memory locations wide, then the first segment corresponds to the first K*N memory locations, the second segment corresponds to the next K*N memory locations, and so on.

Figure 2A:
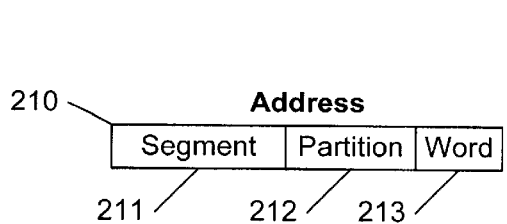
FIGS. 2A and 2B illustrate an example address structure and buffer register for use in a memory access architecture in accordance with this invention.

If the number of partitions, K, is a power of two, and the width of each partition, N, is also a power of two, an address structure 210 as illustrated in FIG. 2A can be used to immediately identify the segment 211, the partition 212 within the segment 211, and the memory location 213 within the partition 212 of the addressed item. For ease of reference, each memory location is hereinafter defined to contain a program or data word, and the location field 213 in the address structure 210 is termed the "word" field 213.

In accordance with this invention, each partition I, II, . . . VIII is associated with a corresponding buffer I, II, . . . VIII 120. When a processor 130 initiates a memory access, a memory access controller 140 loads the N words of the addressed segment 211 and partition 212 into the buffer 120, corresponding to the address 210, and the processor reads from this buffer 120. At the same time, the controller 140 prefetches the next N words into the buffer corresponding to the next partition. As each subsequent item is addressed, the controller 140 checks to determine whether the item is already loaded in the buffer 120, and allows the processor 130 to read it from the buffer 120 if it is. Otherwise, the controller 140 fetches the corresponding N words from the memory into the buffer 120. As each set of N words is stored in the buffer 120, the controller 140 records the segment 211 corresponding to the stored words, using, for example, a set of registers 230, illustrated in FIG. 2B. Note that the stored segment number in a register associated with a particular partition is sufficient to uniquely identify the locations in memory 110 corresponding to the data in the buffers 120. With each access, the controller 140 checks to assure that the next buffer contains the next set of N words, and continually prefetches the next set as required. In this manner, the set of buffers 120 will eventually contain a set of words prior to the currently addressed word, and a set of words subsequent to the currently addressed word.

Of particular significance, because of the consistent and sequential fetching from memory, the contents of the buffers 120 can be fairly well determined at any point in a program sequence. Using the example of a loop structure with a conditional branch instruction that controls the loop at its end, discussed above, instructions after the conditional branch instruction will be known to be in the current or next buffer when the conditional branch instruction is executed, because the controller 140 automatically pre-fetches the next buffer. Instructions before the conditional branch instruction will be known to be in the current or prior buffers, because the controller 140 does not overwrite a buffer except when the aforementioned pre-fetch occurs. If there are K buffers of size N, then any loop that is (K−2)*N+1 words long, or less, will be known to be in the set of buffers 120, because the prior K−2 buffers will not be overwritten. Due to the circular nature of the partitioning of the memory 110 (e.g. sequential memory elements 132, 133), the K−1 buffer corresponds to the "next" buffer, and will be overwritten by the prefetch that accompanies an access to the preceding buffer. Any loop that is larger than (K−1)*N words long will be known to be outside the set of buffers 120, and a memory access delay will be incurred. For loops between (K−2)*N+1 and (K−1)*N, the specific word location of the start and end of the loop will determine whether the particular loop will be in the set of buffers 120. For example, if the conditional branch is the last word in a buffer, and the start of the loop is at a first word of a buffer, the loop can be as large as (K−1)*N words, because only N words beyond the conditional branch will be stored in the buffers 120. On the other hand, if the conditional branch is at the first word of a buffer, 2N−1 words beyond the conditional branch will be stored in the buffers 120, leaving only K*N−(2N−1) words available to contain the loop. Note that, prior to actually allocating the program to memory, loops that are smaller than (K−2)*N+1 words, and loops that are larger than (K−1)*N words can be identified, to potentially distinguish 'safe' loops from 'problem' loops, for the user's consideration for improvement. After a specific allocation to memory, if desired, loops that are between (K−2)*N+1 and (K−1)*N words in size can be identified, as marked as 'safe' or 'problem' based on the word-location of the conditional branch instruction.

In like manner, a variety of access schemes can be provided, dependent upon anticipated program structures, or actual program structures. For example, multiple prefetches of blocks of N words may be effected, to support loops that have their conditional branch instruction at the start of the loop. In such an embodiment, the size of the prefetches, in terms of blocks of N words, may be defined as a parameter when the program begins execution, or as a parameter that can be dynamically changed via program instruction. In the latter case, compilers or assemblers can be configured to adjust the size of the prefetch based on the structure of the particular sections of code. These and other memory access optimization schemes will be evident to one of ordinary skill in the art in view of this disclosure.

By providing a substantially deterministic memory access scheme, the execution time of a program can be estimated, and structural changes can be made in the program to increase the memory access efficiency. That is, for example, an analysis program can be provided that identifies program loops in excess of (K−1)*N words, for the user's consideration for change. As compared to other techniques wherein 'suggested improvements' are based on general rules and common heuristics, the memory access scheme of this invention allows for fairly definitive suggested improvements, with substantially known results. Automated schemes may also be embodied in compilers, as well, to structure the resultant code to conform to the deterministic constraints of this invention. These and other advantages of an efficient memory access scheme with deterministic behavior will be obvious to one of ordinary skill in the art in view of this disclosure.

The parameters K and N are selected based on the expected structure of programs that will be stored in the memory 110, and based the size and cost of buffers that are local to the processor 130. The width N is typically selected based on a size that provides efficient memory access, and based on the relative speed of memory access compared to buffer access. Some memory structures are specifically designed for multi-word access, and N should be chosen as a multiple of the size of the multi-word access capability. Also, as discussed above, when a word is accessed from the buffer 120, a prefetch of words into the next buffer is effected, if required. Assuming a sequential flow from the first word in a buffer to the last, N is preferably chosen to be long enough so that the time required to execute N instructions is longer than the access time required to prefetch into the next buffer, so that the next buffer contains the appropriate instructions when the prior instructions are completed. The parameter K is typically selected after selecting N, based on the expected length of routines, such as loops, that will be commonly used. As noted above, program loops of less than (K−2)*N+1 words in length will be guaranteed to be wholly located in the K buffers. If L is the estimated largest size of a common loop structure, then K is preferably selected to be at least L/N+2. Also, as noted above, selecting K and N to be powers of two provides for an ease of address decoding. Copending U.S. patent application, "MEMORY ACCELERATOR FOR ARM PROCESSORS", Ser. No. 09/780,158, filed Feb. 20, 2001 for Gregory K. Goodhue, Ata R. Khan, John H. Wharton, and Robert Kallal, Attorney Docket US018011, teaches a partitioning of the memory into four quadrants, each quadrant being four words wide, which is particularly well suited for a micro-controller embodiment.

It is significant to note that the maximum number of memory access delays per loop, regardless of the loop size, is one. For loops less of less than (K−2)*N+1 instructions, and some loops between (K−2)*N+1 and (K−1)*N instructions, the number of access delays per loop is zero, for all other loops, the number of access delays per loop is one. Thus, the worse case performance occurs for loops of (K−1)*N+1 instructions; as the size of the loop increases, the automatic sequential prefetch continually eliminates memory access delays, thereby improving the overall memory access efficiency, compared to a loop of (K−2)*N+1 instructions.

Figure 2B:
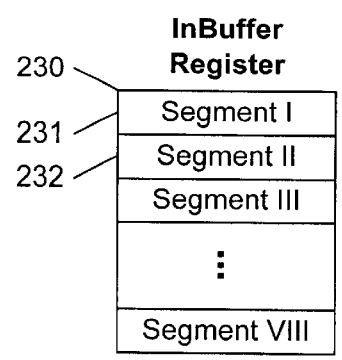
Figure 3:
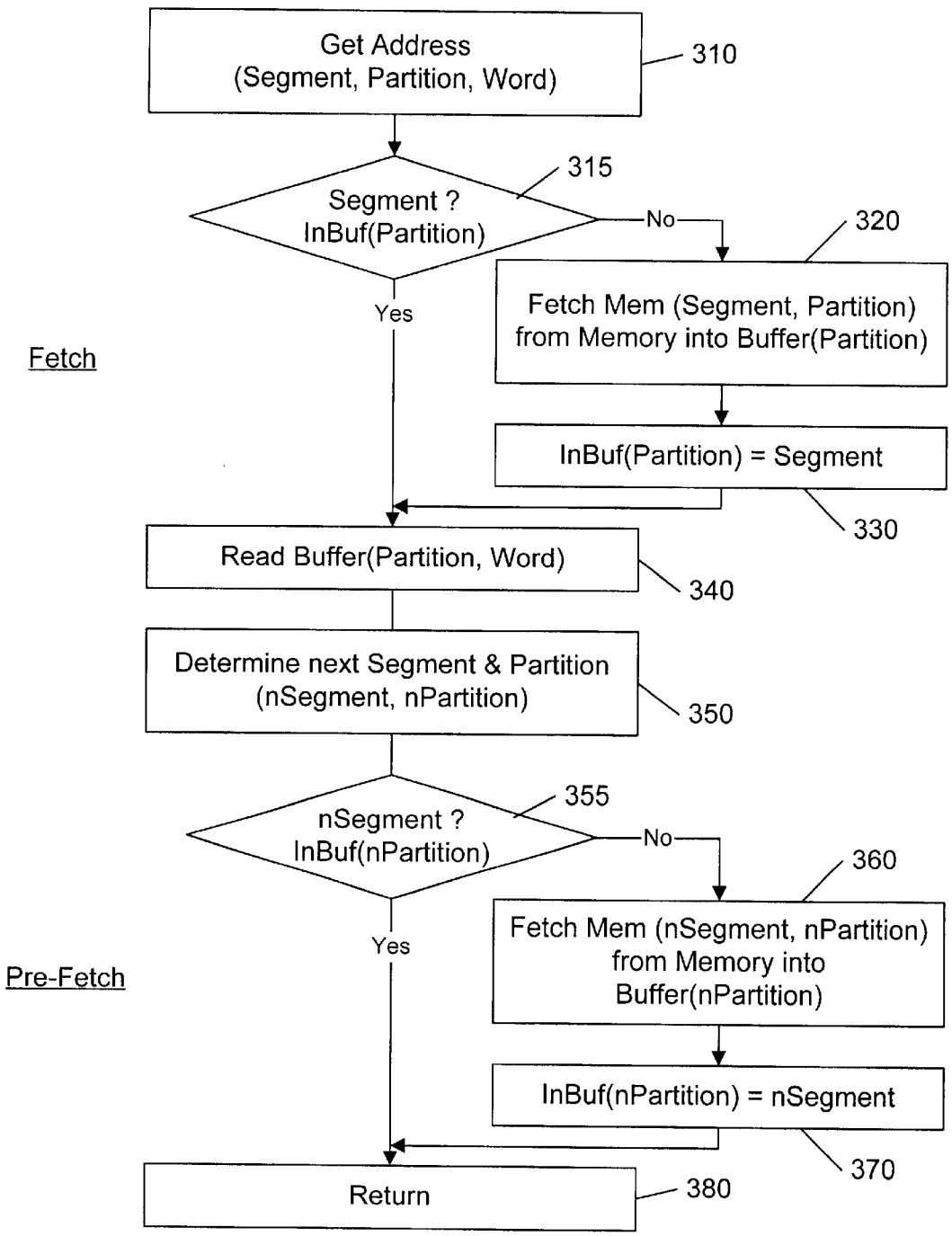
FIG. 3 illustrates an example flow diagram for memory access in accordance with this invention.

The address structure and register organization of FIGS. 2A and 2B are presented for illustrative purposes; alternative memory management techniques, common in the art, may also be employed. In like manner, any of a variety of techniques can be employed to facilitate the memory access scheme of this invention. FIG. 3 illustrates an example flow diagram for memory access in accordance with this invention, for completeness, although the invention is not limited to this example embodiment.

At 310, the memory access controller obtains the next address to be processed. Typically, this address corresponds to the contents of a conventional program counter that identifies the next instruction to be executed by the processor. In the example of a conditional branch, the processor updates the program counter upon execution of a test associated with the conditional branch. As such, the actual address may only be known at the time the address is processed.

At 315, the memory access controller checks whether the segment that corresponds to the address is stored in the buffer that also corresponds to the partition corresponding to this address. That is, with reference to FIGS. 1, 2A, and 2B, if the partition field 212 of the address 210 indicates that it is in partition II of the memory 120, then the InBuffer register 232, corresponding to partition II, is checked to see if there is a match between the segment number stored in the register 232 and the segment number 211 corresponding to the address 210.

If, at 315, the segment numbers match, the addressed word 213 is read directly from the buffer 120 (Buffer II in this example), at 340, thereby avoiding a read from the memory 110.

If, at 315, the segment 211 of the address 210 does not match the segment 232 currently contained in the buffer 120 corresponding to the partition 212 of the address 210, the N words of the segment 211 and partition 212 of the address 210 are fetched from the memory 110 into the buffer 120 corresponding to the partition 212, at 320. The InBuffer register of the partition 212 is updated to reflect the current segment 211 of the buffer 120 corresponding to the partition 212, at 330. The addressed word 213 is read directly from the buffer 120 (Buffer II in this example), at 340.

At 350–370, a prefetch of the next N words is effected, if required. At 350, the next segment and partition number is determined, taking into account the circular nature of the partitioning scheme. That is, the partition number is incremented. If this incrementing produces a partition number beyond the number of partitions, it is reset to the first partition number, and the segment number is incremented. In the flow diagram of FIG. 3, the terms nSegment and nPartition correspond to the resultant cyclically-incremented segment and partition numbers. The blocks 355–370 correspond to the above-described blocks 315–330, except with the next nSegment and nPartition parameters in lieu of the prior Segment and Partition parameters. In this manner, it is assured that the next addressed block of N words is contained in the buffers 120.

As would be evident to one of ordinary skill in the art, the prefetch process 350–370 can be executed in parallel with the read and/or fetch process 310–340. That is, for example, the process 350–370 may be spawned as a separate process thread immediately after the segment and partition of the address is determined, at 310, or, it could include its own segment and partition determination means, and be spawned at the same time that block 310 is executed. Similarly, it may occur at the end of the process 310–340 but configured so as to allow the processor to continue as soon as the word is read, at 340. Other schemes will be evident, based on the particular access capabilities of the memory 110 and the parallelisms provided by the processor 130.

Note that although this invention has been presented using the paradigm of read-access to memory, it is equally applicable to read-write access to memory. In a read-write access embodiment, the above described scheme is augmented with a write of the contents of the buffers to memory whenever the buffer is to be reallocated to a different segment and the contents of the buffer have changed since it was initially fetched from memory. Memory management schemes to facilitate and optimize such updates to memory from temporary buffers are common in the art.

In like manner, the particular structures of FIGS. 1–2 are presented for ease of understanding. The memory access controller 140, the buffers 120, the controller 140, and the registers 230 may, for example, form a single logic block; any or all of these items may be included within the processor 130; and so on. Similarly, combinations of hardware and firmware may also be used. In some systems, for example, the memory access controller may be a set of microcode that is executed in a microcode engine, or it may be a set of logic gates, and so on.

Although this invention is presented primarily in the context of memory access for program instructions, it is equally applicable to data access schemes, particularly for applications that involve a sequential access to data items, and repeated access to blocks of data items, such as a graphics processing system. The buffers in such an embodiment may be data arrays in a program that are loaded from corresponding portions of a disk file containing graphic objects, textures, and so on.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the memory access scheme presented herein can be used with other access schemes as well. Following the multiple-cache paradigm, multiple sets of buffers I, II, . . . VIII can be provided to buffer items from different areas of the memory 110. When a branch instruction, or a data access instruction, occurs that references an address at a substantial distance from the current instruction, the N words corresponding to the address can be loaded into a corresponding buffer of a second set of buffers, and the next N words prefetched into the next buffer of the second set of buffers, as presented above with regard to the single set of buffers. In this manner, if one routine repeated calls another routine, or accesses data, in another area of memory, both areas of memory can be buffered, thereby avoiding repeated memory accesses. The use of two sets of buffers, for example, is particularly well suited for interleaved access to program code and data. These and other system configuration and optimization features will be evident to one of ordinary skill in the art in view of this disclosure, and are included within the scope of the following claims.

We claim:

1. A memory system, comprising:
    a memory, the memory logically partitioned into K two-dimensional partitions, each of the partitions having N columns, and S rows;
    a first set of K one-dimensional buffers, where each buffer has a width of N addressable locations, and each of the K one-dimensional buffers is associated for one or more memory transactions, with a unique one of the K two-dimensional partitions;
    K registers, each of the K registers uniquely associated with a unique one of the K two-dimensional partitions; and
    a memory controller coupled to the memory, coupled to the K registers, and further coupled to the K one dimensional buffers, the memory controller configured to direct memory transactions between each of the K partitions and each of the respectively associated K one-dimensional buffers, the memory controller further configured to record, into each of the K registers, a number indicative of the row of the partition with which a memory transaction has been performed;
    wherein K, N, and S are integer numbers.

2. The memory system of claim 1, wherein the memory controller is further configured to receive an address of a requested data item, determine whether the requested data item is in one of the one-dimensional buffers, and, if the requested data item is not in one of the one-dimensional buffers, load a row of the partition in which the requested data item is located into the one dimensional buffer associated with the partition from which the requested data item is read.

3. The memory system of claim 2, wherein the memory controller is further configured to prefetch a next sequential row from the next sequential partition and load that row into the one-dimensional buffer uniquely associated with the next sequential partition.

4. The memory system of claim 3, wherein K, N, and S are each multiples of two.

5. The memory system of claim 4, wherein memory transactions comprise loading data from the $K^{th}$ partition to the $K^{th}$ one-dimensional buffer.

6. The memory system of claim 4, wherein memory transactions comprise storing data from the $K^{th}$ one-dimensional buffer to the $K^{th}$ partition.

7. The memory system of claim 4, wherein the memory controller comprises logic circuits.

8. The memory system of claim 4, wherein the memory controller comprises a microcode engine adapted to execute microcode.

9. The memory system of claim 4, further comprising a second set of K one-dimensional buffers coupled to the memory controller.

10. The memory system of claim 4, wherein the memory controller is further configured to receive at least one program instruction which determines the amount of data loaded during a prefetch operation.

11. A method of operating a memory system, comprising:
    a) receiving a first address for a first requested data item;
    b) determining whether the requested data item is in one of a first set of K buffers;
    c) fetching, if the determination of (b) is negative, a first group of N words from a first one of K two-dimensional partitions of a memory, storing the N words in a first one of K one-dimensional buffers, and recording a number in a first one of a set of K registers, the number indicative of a row of the first partition; and
    d) fetching a second group of N words, where the second group of N words are the next sequential group after the first group;
    wherein the second group of words is fetched prior to receiving an address corresponding to any of the words in the second group; N and K are integer multiples of two; and each of the K one-dimensional buffers has at least N addressable locations.

12. The method of claim 11, further comprising receiving an instruction which sets the value of N.

13. The method of claim 11, further comprising:
    receiving a second address for a second requested data item;
    fetching a third group of N words from a second one of K two-dimensional partitions of the memory, storing the third group of N words in a second one of the K one-dimensional buffers; and
    fetching a fourth of group of N words, where the fourth group of N words are the next sequential group after the third group.

14. The method of claim 12, further comprising storing the second group of N words in a one-dimensional buffer which is uniquely associated with the partition from which the second group of N words is fetched.

* * * * *